(12) United States Patent
Brilland et al.

(10) Patent No.: US 6,516,118 B1
(45) Date of Patent: Feb. 4, 2003

(54) OPTICAL FIBER SUITABLE FOR PRODUCING DOPED-FIBER AMPLIFIER GAIN EQUALIZING FILTERS

(75) Inventors: Laurent Brilland, Perros-Guirec (FR); David Pureur, Perros-Guirec (FR); Jean-François Bayon, Lannion (FR); Eric Delevaque, Ploumilliau (FR)

(73) Assignee: SA Highwave Optical Technologies (FR)

( * ) Notice: Subject to any disclaimer, the term of this patent is extended or adjusted under 35 U.S.C. 154(b) by 4 days.

(21) Appl. No.: 09/715,515

(22) Filed: Nov. 16, 2000

(30) Foreign Application Priority Data

Nov. 16, 1999 (FR) .............................. 99 14345

(51) Int. Cl.⁷ .................................. G02B 6/34
(52) U.S. Cl. .............................. 385/37; 385/127
(58) Field of Search ...................... 385/37, 123, 127, 385/129

(56) References Cited

U.S. PATENT DOCUMENTS 5,852,690 A * 12/1998 Haggans et al. .............. 385/37
6,278,817 B1 * 8/2001 Dong .......................... 385/37

OTHER PUBLICATIONS

E. Erdogan, J.E. Sipe, "Tilted fiber phase gratings", J. Opt. Soc. Am. A, vol. 13, No. 2, 1996.

L. Brilland, D. Pureur, J.F. Baton and E. Delevaque, "Slanted gratings UV–written in photosensitive cladding fibre", Elect. Letters, vol. 35, No. 3, pp. 234–236, 1999.

I. Riant, L. Gasca, P. Sansonetti, G. Bourret, J. Chesnot, "Gain equalization with optimized slanted Bragg grating on adapted fibre for multichannel long–haul submarine transmission", Optical Fiber Communication Conference, ThJ6, San Diego, Feb. 1999.

G.W. Yoffe, P.A. Krugg, F. Ouelette, "Temperature–Compensated optical fiber Bragg gratings", OFC 95.

V. Mirahi and J.E. Sipe, "Optical properties of photosensitive fiber phase gratings", IEEE, Journal of Lightwave Technology, vol. 11, No. 10, Oct. 1993.

E. Erdogan, "Fiber Grating Spectra", IEEE, J.L. Technology, vol. 15 No. 8, 1997.

R. Kashyap, R. Wyatt and R.J. Campbell, "Wideband gain flattened erbium fibre amplifier using a photosensitive fibre blazed grating", Elect. Lett., vol. 29, pp 154–165, 1993.

* cited by examiner

Primary Examiner—Khiem Nguyen
(74) Attorney, Agent, or Firm—Blakely Sokoloff Taylor & Zafman

(57) ABSTRACT

An optical fiber for producing energy-dissipative and wavelength—selective filters is presented. The fiber includes a core and a cladding that are photosensitive to radiation and have a periodic perturbation of the refractive index. The periodic perturbation defines at least one Bragg grating with lines tilted with respect to the axis of the fiber. The refractive index difference between the core and the cladding is less than $3 \times 10^{-3}$.

20 Claims, 3 Drawing Sheets

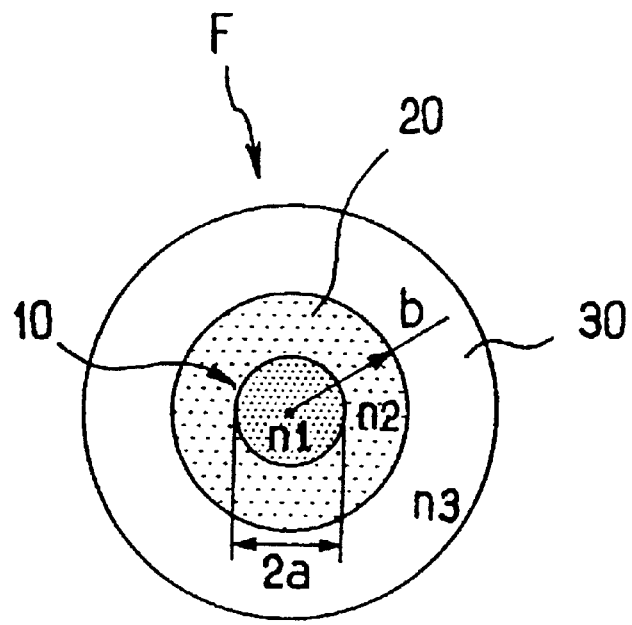
FIG_1
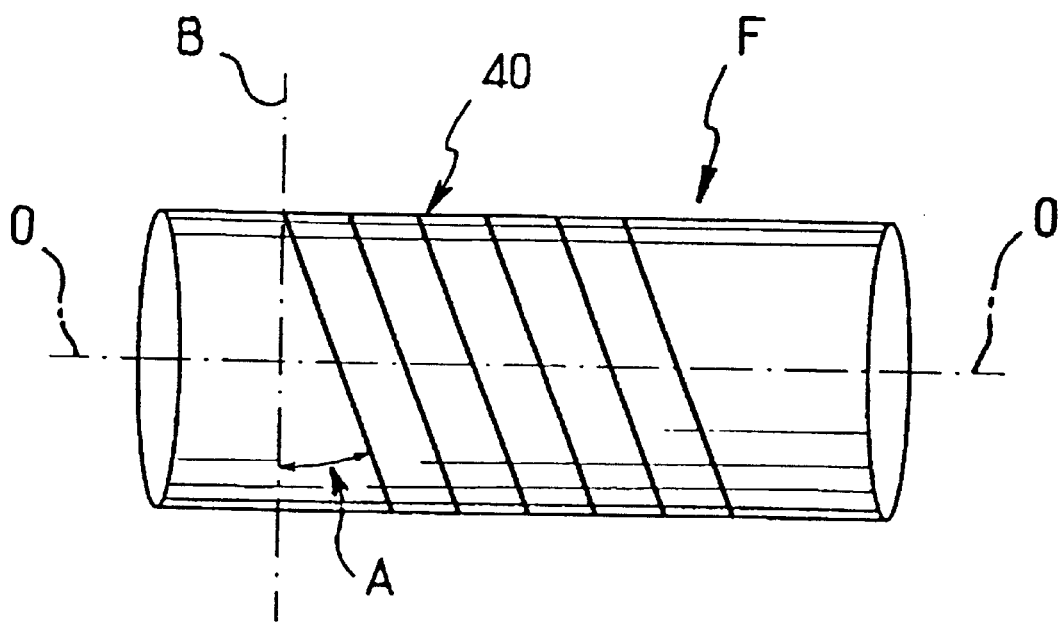
FIG_2

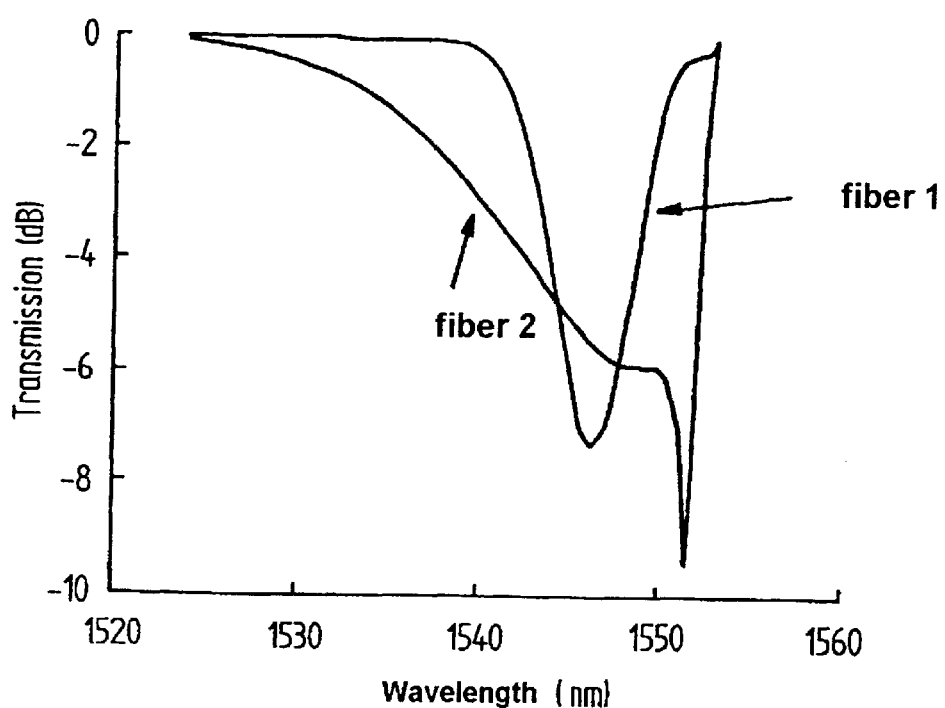
FIG_3
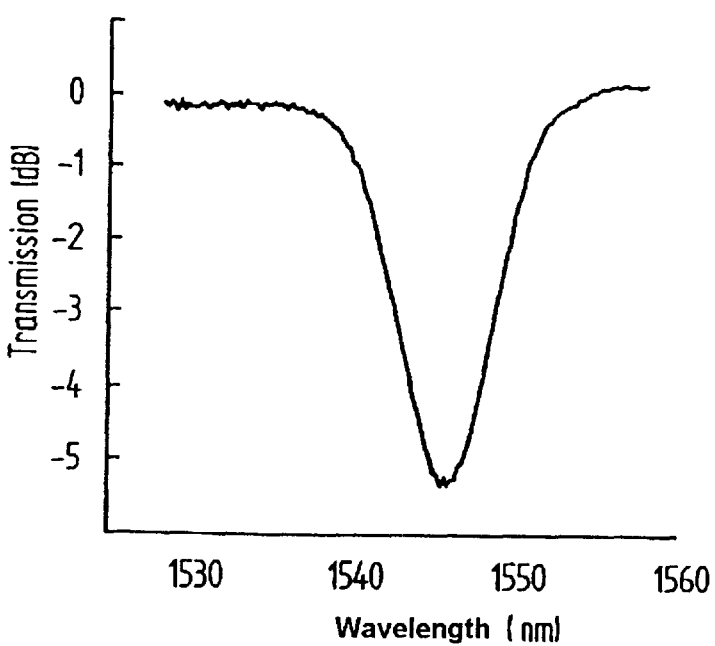
FIG_4

OPTICAL FIBER SUITABLE FOR PRODUCING DOPED-FIBER AMPLIFIER GAIN EQUALIZING FILTERS

BACKGROUND

1. Field

The present invention relates to the field of optical fibers.

More specifically, the present invention relates to the design of an optical fiber suitable for producing energy-dissipative and wavelength-selective filters capable of acting as doped-fiber amplifier gain equalizing filters.

2. Description of the Related Art

The field of optical fibers has already given rise to a vast amount of literature.

An optical fiber is a waveguide. It is called a monomode fiber when only a single light mode propagates through it. This mode is called the fundamental mode.

Those skilled in the art know that certain dopants (germanium, fluorine, etc.) inserted into the fiber are sensitive to light radiation (ultraviolet radiation in the case of the dopants mentioned) and that the physicochemical reactions caused by this radiation may modify the refractive index of the photosensitive part.

A periodic perturbation of the refractive index of the photosensitive part of the fiber constitutes a Bragg grating.

The spectral response of short-pitch Bragg gratings produced in an optical fiber results from the coupling of the copropagative fundamental mode into counterpropagative cladding modes and into the guided coupling corresponds to the part which is reflected in the firection opposite to that of the fundamental mode (it is also called reflection or reflected power). The counterpropagative cladding modes are modes propagating in the cladding which surrounds the core of the fiber. If the grating is coated with a material whose index is close to that of silica, the cladding modes then become radiative modes. All the latter leak to the outside of the fiber (See, V. Mirahi and J. E. Sipe, "Optical properties of photosensitive fiber phase gratings", IEEE, Journal of Lightwave Technology, Vol. 11, No. 10, October 1993; E. Erdogan, "Fiber Grating Spectra", IEEE, J.L. Technology, Vol. 15 No. 8, 1997).

Moreover, those skilled in the art know that the fact of tilting the lines of the grating with respect to the axis of the fiber promotes coupling into the radiative modes to the detriment of guided counterpropagative coupling.

Such gratings have already been produced in a fiber having a photosensitive core in order to make the gain of doped-fiber amplifiers uniform. the results are presented in reference (See, R. Kashyap, R. Wyatt and R. J. Campbell, "Wideband gain flattened erbium fibre amplifier using a photosensitive fibre blazed grating", Elect. Lett., Vol. 29, pp 154–165, 1993). An amplified spontaneous emission (ASE) spectrum has been equalized to ±0.5 dB at 35 nm. The reflected power problem is very briefly discussed. In reference, Erdogan shows that the change in the power reflected by the grating as a function of the angle of tilt of the lines is oscillatory (E. Erdogan, J. E. Sipe, "Tilted fiber phase gratings", J. Opt. Soc. Am. A, Vol. 13, No. 2, 1996). He has shown that the amplitude of these oscillations is smaller in the case of the writing of gratings into a fiber in which part of the cladding is as photosensitive as the core (see, L. Brilland, D. Pureur, J. F. Baton and E. Delevaque, "Slanted gratings UV-written in photosensitive cladding fibre", Elect. Letters, Vol. 35, No. 3, pp 234–236, 1999).

Tilted gratings written into a fiber with a photosensitive cladding have already been used to equalize the 1 543.5 nm to 1 561.5 nm erbium gain band (see, I. Riant, L. Gasca, P. Sansonetti, G. Bourret, J. Chesnot, "Gain equalization with optimized slanted Bragg grating on adapted fibre for multichannel long-haul submarine transmission", Optical Fiber Communication Conference, ThJ6, San Diego, February 1999).

However, as far as the inventors are aware, despite the extensive research conducted in the field, no gain equalizing filter composed of tilted Bragg gratings produced in a fiber with a photosensitive core and photosensitive cladding has yet been developed in order to make the gain of fiber amplifiers uniform over a wavelength range of more than 20 nm.

SUMMARY

The objective of the invention is to improve the known state of the art by proposing such a device.

This objective is achieved within the context of the present invention by means of an optical fiber whose core and part of the cladding are photosensitive to radiation, for example ultraviolet radiation, and in which fiber the difference in refractive index ($\Delta n$) between the core and the cladding is less than $3 \times 10^{-3}$.

According to another advantageous feature of the present invention, the normalized frequency parameter V is less than 1.5 at a wavelength of 1.55 $\mu$m.

According to another advantageous feature of the present invention, the radius b of the photosensitive cladding is at least 1.5 times greater than the radius of the core a.

According to another advantageous feature of the present invention, the tilt of the lines of the Bragg grating with respect to the axis 0—0 of the fiber is great than 3°.

According to another advantageous feature of the present invention, the fiber comprises three to five Bragg gratings having different spectral characteristics.

BRIEF DESCRIPTION OF THE DRAWINGS

Further features, objectives and advantages of the present invention will appear upon reading the detailed description which follows and with regard to the appended drawings given by way of nonlimiting example and in which:

FIG. 1 shows schematically the cross section of a fiber with a photosensitive cladding according to the present invention;

FIG. 2 illustrates a side view of such a fiber having a tilted Bragg grating and illustrates especially the definition of the blaze angle of such a grating;

FIG. 3 shows the spectral responses of gratings written with a 4° blaze angle into a fiber with a photosensitive cladding (fiber 1) according to the present invention and into a conventional fiber (fiber 2) without a photosensitive cladding;

FIG. 4 shows the experimental spectral response of a tilted Bragg grating written into a fiber with a photosensitive cladding according to the present invention;

DETAILED DESCRIPTION

Figure 5:
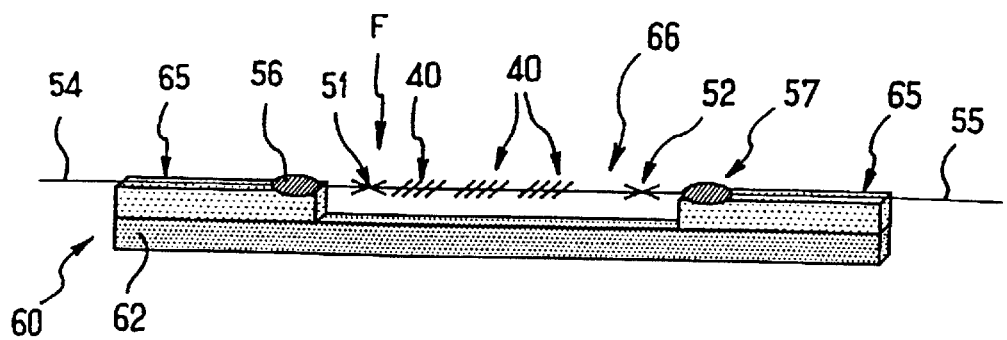
FIG. 5 shows the installation of a fiber according to the present invention placed on a support suitable for ensuring that the tilted gratings are thermally stabilized.

Shown in the appended FIG. 1 is a fiber F comprising:

a core 10 of index n1, made of photosensitive material, and of diameter 2a;

a cladding 20, which surrounds the core 10, of index n2, made of a photosensitive material and of radius b; and an external sheath 30 of index n3 which itself surrounds the cladding 20 9the index n3 is equal to the index n2 to within a few $10^{-4}$).

The tilted Bragg gratings are preferably written into this fiber in the following manner: an ultraviolet source irradiates the optical fiber placed in a field of interference fringes produced by a device provided for this purpose, The angel A between the perpendicular B to the axis 0—0 of the fiber and the direction of the lines 40 of the grating is called the blaze angle (FIG. 2). This angle A determines the spectral width of the grating. The higher the blaze angle A, the broader the spectral response due to coupling into the radiative modes. For a fixed blaze angle A, for an identical attenuation level and for the same central wavelength, the spectral width decreases with the index difference between the core 10 and the cladding 20. the combination of a photosensitive core 10, a photosensitive cladding 20 and an index difference $\Delta n$ of less than $3 \times 10^{-3}$ (with V<1.5) according to the present invention, makes the spectral response symmetrical and narrow.

FIG. 3 shows the calculated spectral transmission as a function of the wavelength of tilted gratings written into two different fibers. The first fiber, according to the present invention, has a photosensitive core 10 and a photosensitive cladding 20 (b=3a), the index difference between the core and the cladding being $\Delta n=2 \times 10^{-3}$ and V=1.5 at 1.55 µm. In contrast, the second fiber has a photosensitive core but a cladding which is not photosensitive, $\Delta n=5 \times 10^{-3}$ and V=2 at 1.55 µm. In both cases, the blaze angle is 4 degrees. FIG. 3 shows that the grating produced in fiber 1 according to the present invention has a spectrum which is symmetrical and narrower than that produced in fiber 2 according to the prior art.

The spectrum of a tilted gratings produced in the fiber 1 according to the present invention is shown in FIG. 4. The spectral profile is symmetrical—the minimum transmission being at –5 dB at a wavelength close to 1547 nm. The mid-height width of this filter is 8 nm. The blaze angle A used is 5 degrees.

Within the context of the present invention, the tilted gratings are preferably written over a fiber length of about 20 mm. the two ends of the fiber are fusion-bonded at 51, 52 to respective sections of type 2 fiber denoted by the reference numbers 54, 55 in FIG. 5. The losses at the fusion-bonded joints are less than 1 dB. The whole assembly is placed in an arrangement 60 making it possible to compensate for the temperature sensitivity of the gratings (FIG. 5). This device guarantees a temperature sensitivity of the wavelength of less than 1 ppm/°C.

Such an arrangement designed to compensate for the temperature sensitivity of the gratings can take on various embodiments.

For example, it may be an arrangement known as a "tabletop" arrangement, as described in documents G. W. Yoffe, P. A. Krugg, F. Ouelette, "Temperature-Compensated optical fiber Bragg gratings", OFC 95 and S. Pitassi et al., "Fiber gratings: Temperature and mechanical sensitivity of narrow band transmission filters using different packaging solutions", Cables and Optical Technologies, Italy.

As illustrated in FIG. 5, such a system comprises a support 60 composed of two materials 62, 65 having different thermal expansion coefficients $\alpha 1$ and $\alpha 2$. Even more specifically, the support 60 comprises a bar 62 made of a first material M1 having a thermal expansion coefficient $\alpha 1$ and two sections 65 made of the second material M2 having a thermal expansion coefficient $\alpha 2$, fixed near the neds of the aforementioned bar 62. A space 66 is thus defined between the two sections 65.

The fiber F according to the invention, having tilted Bragg gratings 40, is placed in this space 66. FIG. 5 also shows the fusion-bonding zones 51, 52 defined between the ends of this fiber F and the sections 54, 55 of type-2 fiber which extend it. Said sections 54, 55 are themselves fixed at respective points 56, 57 to the sections 65 of material M2. The Bragg gratings 40 are thus positioned between the fixing points 56, 57 in the space 66. Preferably, the fixing at the points 56, 57 is done while applying a slight tension to the fiber F.

It has been shown that optimizing the lengths of the elements 62, 65 making up the support allows the Bragg length to be kept constant whatever the variation in temperature.

The device according to the present invention may have many applications.

The tilted gratings 40 produced in this fiber are energy-dissipative and wavelength-selective filters. They may be used as a sensor (temperature, tension, compression sensor). They are also sensitive to the index of the medium external to the fiber.

Doped-fiber amplifiers are key elements in transmission systems based on wavelength multiplexing. It is necessary to make their gain as uniform as possible so as to fully optimize the signal propagation distance for a given binary error rate.

The fiber according to the present invention makes it possible to write tilted Bragg gratings suitable for equalizing the gain of doped-fiber amplifiers. The symmetry and the width of the spectral response of such gratings enables the gain of the amplifiers to be made uniform over more than 20 nm. To do this, several gratings having different spectral characteristics (transmission, central wavelength and width) may be written into said fiber in order to form a gain equalizing filter.

Figure 6:
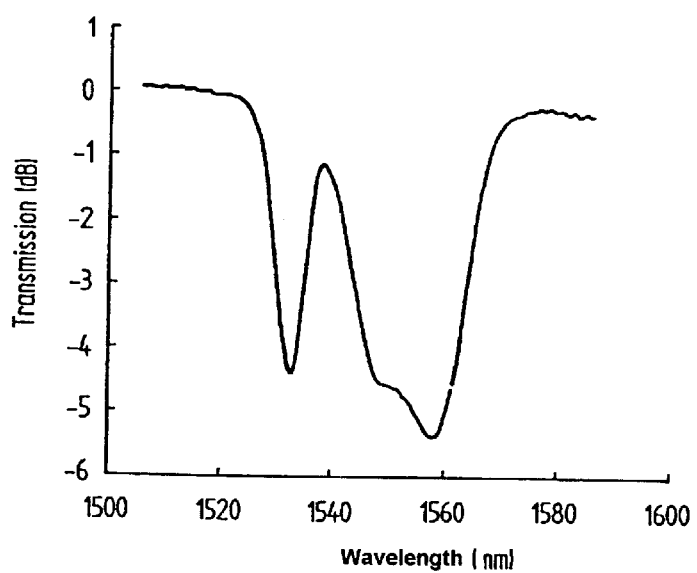
FIG. 6 shows the transmission/wavelength response of a doped-fiber amplifier gain equalizing filter composed of three tilted gratings according to the present invention.

For example, FIG. 6 shows the response (transmission in dB as a function of the wavelength) of a doped-fiber amplifier gain equalizing filter comprising three tilted Bragg gratings produced in a fiber according to the present invention.

This fiber is then inserted into a fiber amplifier module.

More particularly, by adjusting the blaze angle A, a spectral symmetry and sharpness sufficient to flatten the gain peak of the amplifiers which is located at a wavelength close to 1532 nm is obtained. This allows the 1528 nm to 1540 nm gain band to be made uniform.

Of course, the present invention is not limited to the particular embodiment that has just been described, but extends to all variants in accordance with its spirit.

What is claimed is:

1. Optical fiber, characterized in that it comprises a core (10) and a cladding (20) which are photosensitive to radiation, having a periodic perturbation of the refractive index of the core (10) and of the photosensitive cladding (20), defining at least one Bragg grating with lines tilted with respect to the axis (O—O) of the fiber, in which fiber the refractive index difference between the core (10) and the cladding (20) is less than $3 \times 10^{-3}$.

2. Fiber according to claim 1, characterized in that the normalized frequency parameter (V) is less than 1.5 at a wavelength of 1.55 μm.

3. Fiber according to claim 1 wherein the radius (b) of the photo-sensitive cladding (20) is at least 1.5 times greater than the radius of the core (a).

4. Fiber according to claim 1 wherein the radius (b) of the photo-sensitive cladding (20) is equal to three times the radius of the core (a).

5. Fiber according to claim 1 wherein the refractive index difference between the core (10) and the cladding (20) is equal to $2 \times 10^{-3}$.

6. Fiber according to claim 1 wherein the tilt of the lines of the Bragg grating (40) with respect to the axis (0—0) of the fiber is greater than 3°.

7. Fiber according to claim 1 wherein tilted Bragg gratings are written into the fiber (F) over a length of about 20 mm.

8. Fiber according to claim 1 wherein said fiber is placed on a support capable of ensuring that the gratings (40) are thermally stabilized.

9. Fiber according to claim 1 wherein said fibers comprises several Bragg gratings having different spectral characteristics in order to form a gain equalizing filter.

10. Fiber according to claim 9, characterized in that it comprises three to five Bragg gratings having different spectral characteristics.

11. Optical fiber, for producing energy-dissipative and wavelength-selective filter comprising a core and a cladding which are photosensitive to radiation, having a periodic perturbation of the refractive index of the core and of the photosensitive cladding, defining at least one Bragg grating with lines tilted with respect to the axis of the fiber, wherein the refractive index difference between the core (10) and the cladding (20) is less than $3 \times 10^{-3}$ and wherein the radius of the photosensitive cladding is at least three times greater than the radius of the core.

12. Fiber according to claim 11, wherein the refractive index difference between the core and the cladding (20) is equal to $2 \times 10^{-3}$.

13. Fiber according to claim 11, wherein the tilt of the lines of the Bragg grating with respect to the axis of the fiber is greater than 3°.

14. Optical fiber for producing energy-dissipative and wavelength selective filter comprising a core and a cladding which are photosensitive to radiation, having a periodic perturbation of the refractive index of the core and of the photosensitive cladding, defining at least one Bragg grating with lines tilted with respect to the axis of the fiber, wherein the refractive index difference between the core and the cladding is less than $3 \times 10^{-3}$, and wherein the tilt of the lines of the Bragg grating with respect to the axis of the fiber is greater than 3°.

15. Fiber according to claim 14 wherein the radius of the photosensitive cladding is at least 1.5 times greater than the radius of the core.

16. Fiber according to claim 14 wherein the radius of the photosensitive is equal to three times the radius of the core.

17. Fiber according to claim 14 wherein the refractive index difference between the core and the cladding is equal to $2 \times 10^{-3}$.

18. Optical fiber for producing energy-dissipative and wavelength selective filter comprising a core and a cladding which are photosensitive to radiation, having a periodic perturbation of the refractive index of the core and of the photosensitive cladding, defining at least one Bragg grating with lines tilted with respect to the axis of the fiber, wherein the refractive index difference between the core and the cladding is less than $3 \times 10^{-3}$, the radius of the photosensitive cladding is at least 1.5 times greater than the radius of the core and the tilt of the lines of the Bragg grating with respect to the axis of the fiber is greater than 3°.

19. Fiber according to claim 18 wherein the radius of the photo-sensitive cladding is equal to three times the radius of the core.

20. Fiber according to claim 18 wherein the refractive index difference between the core and the cladding is equal to $2 \times 10^{-3}$.

* * * * *